United States Patent
Furuniwa et al.

(10) Patent No.: US 9,211,865 B2
(45) Date of Patent: Dec. 15, 2015

(54) WOVEN FABRIC AND PROCESS OF PRODUCING SAME

(71) Applicant: Toray Industries, Inc., Tokyo (JP)

(72) Inventors: Hiroki Furuniwa, Otsu (JP); Tetsuya Ohara, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/429,513

(22) PCT Filed: Sep. 27, 2013

(86) PCT No.: PCT/JP2013/076261
§ 371 (c)(1),
(2) Date: Mar. 19, 2015

(87) PCT Pub. No.: WO2014/051049
PCT Pub. Date: Apr. 3, 2014

(65) Prior Publication Data
US 2015/0246655 A1    Sep. 3, 2015

(30) Foreign Application Priority Data
Sep. 27, 2012   (JP) .................. 2012-214024

(51) Int. Cl.
*B60R 21/16* (2006.01)
*D03D 47/40* (2006.01)
*B60R 21/235* (2006.01)
*D03D 5/00* (2006.01)
*D03D 1/02* (2006.01)
*D03D 15/00* (2006.01)
*D03D 13/00* (2006.01)
*D03D 47/32* (2006.01)
*D03D 19/00* (2006.01)

(52) U.S. Cl.
CPC ............. *B60R 21/235* (2013.01); *D03D 1/02* (2013.01); *D03D 5/00* (2013.01); *D03D 13/008* (2013.01); *D03D 15/00* (2013.01); *D03D 47/32* (2013.01); *B60R 2021/23509* (2013.01); *B60R 2021/23542* (2013.01)

(58) Field of Classification Search
CPC ............ D03C 7/06; D03C 7/00; D03C 7/04; D03C 7/08; B60R 21/235; B60R 2021/23547; B60R 2021/23576; B60R 2021/23514; Y10T 428/24785; Y10T 428/1362; Y10T 428/2481; Y10T 428/1369; Y10T 428/27; Y10T 442/3236; Y10T 442/3309; D03D 19/00; D03D 1/02; D03D 3/00; D03D 47/308; D03D 47/40; D03D 47/50; D03D 5/00; D03D 11/00; D03D 11/02; D03D 15/08; D03D 15/12; D03D 3/02; D03D 47/125
See application file for complete search history.

(56) References Cited

U.S. PATENT DOCUMENTS

| | | | | | |
|---|---|---|---|---|---|
| 2,319,307 | A | * | 5/1943 | Eddy | 428/193 |
| 2,399,880 | A | * | 5/1946 | Moessinger | 139/54 |
| 2,840,117 | A | * | 6/1958 | Scruggs | 139/383 R |
| 2,998,030 | A | * | 8/1961 | Koppelman et al. | 139/387 R |
| 3,280,852 | A | * | 10/1966 | Rietzler | 139/54 |
| 3,369,957 | A | * | 2/1968 | Caroselli et al. | 428/196 |
| 3,720,236 | A | * | 3/1973 | Strauss | 139/54 |
| 3,841,358 | A | * | 10/1974 | Svaty et al. | 139/54 |
| 3,871,414 | A | * | 3/1975 | Palencher | 139/54 |
| 3,991,249 | A | * | 11/1976 | Yamashita et al. | 428/35.5 |
| 4,066,105 | A | * | 1/1978 | Heinrich et al. | 139/54 |
| 4,072,174 | A | * | 2/1978 | Wagner | 139/54 |
| 4,108,213 | A | * | 8/1978 | Guttinger | 139/54 |
| 4,421,141 | A | * | 12/1983 | Brouwer | 139/54 |
| 4,498,504 | A | * | 2/1985 | Allen et al. | 139/302 |
| 4,580,605 | A | * | 4/1986 | Gosciniak et al. | 139/54 |
| 4,894,276 | A | * | 1/1990 | Bryant | 428/193 |
| 5,011,183 | A | * | 4/1991 | Thornton et al. | 280/743.1 |
| 5,085,917 | A | * | 2/1992 | Hodnett, III | 428/193 |
| 5,098,125 | A | * | 3/1992 | Thornton et al. | 280/743.1 |
| 5,100,168 | A | * | 3/1992 | Horiuchi et al. | 280/728.1 |
| 5,110,666 | A | * | 5/1992 | Menzel et al. | 428/196 |
| 5,114,180 | A | * | 5/1992 | Kami et al. | 280/743.1 |
| 5,208,097 | A | * | 5/1993 | Honma et al. | 442/164 |
| 5,215,795 | A | * | 6/1993 | Matsumoto et al. | 428/36.1 |
| 5,421,378 | A | * | 6/1995 | Bowers et al. | 139/435.1 |
| 5,503,197 | A | * | 4/1996 | Bower et al. | 139/435.1 |
| 5,538,280 | A | * | 7/1996 | Gray et al. | 280/743.1 |
| 5,704,402 | A | * | 1/1998 | Bowen et al. | 139/389 |
| 5,735,316 | A | * | 4/1998 | Hehle | 139/194 |
| 5,988,228 | A | * | 11/1999 | Krumm | 139/54 |
| 6,311,737 | B2 | * | 11/2001 | Wahhoud et al. | 139/50 |
| 6,467,511 | B1 | * | 10/2002 | Sollars | 139/430 |
| 6,866,068 | B2 | * | 3/2005 | Berger et al. | 139/420 A |
| 6,978,808 | B2 | * | 12/2005 | Walsh et al. | 139/11 |
| 6,994,125 | B2 | * | 2/2006 | Trondle et al. | 139/414 |
| 7,841,369 | B1 | * | 11/2010 | Osborne | 139/421 |
| 2001/0013377 | A1 | * | 8/2001 | Wahhoud et al. | 139/54 |
| 2002/0036023 | A1 | * | 3/2002 | Sollars | 139/109 |
| 2002/0152594 | A1 | * | 10/2002 | Berger et al. | 28/122 |
| 2005/0011578 | A1 | * | 1/2005 | Walsh et al. | 139/383 R |
| 2008/0026657 | A1 | * | 1/2008 | Sollars | 442/76 |

FOREIGN PATENT DOCUMENTS

JP   9-302550   11/1997
JP   10-236253   9/1998

(Continued)

*Primary Examiner* — Bobby Muromoto, Jr.

(74) *Attorney, Agent, or Firm* — DLA Piper LLP (US)

(57) ABSTRACT

A woven fabric includes a synthetic fiber multifilament yarn as a ground yarn, and in a selvage weave portion present in an end portion of the woven fabric: a binding yarn constructed of a filament having a fineness of 33 dtex or less; an additional yarn constructed of a filament having a fineness of 33 dtex or less; and a selvage-tightening yarn constructed of a multifilament having a total fineness that is 80% or greater of the total fineness of the ground yarn.

20 Claims, No Drawings

(56) References Cited

FOREIGN PATENT DOCUMENTS

| JP | 2001-355143 | 12/2001 |
| JP | 2002-69790 | 3/2002 |
| JP | 2002-212856 | 7/2002 |
| JP | 2009-35834 | 2/2009 |

* cited by examiner

WOVEN FABRIC AND PROCESS OF PRODUCING SAME

TECHNICAL FIELD

This disclosure relates to a woven fabric and a process of producing the woven fabric. More particularly, the disclosure relates to a woven fabric suitable as a base cloth for airbags, and a process of producing the woven fabric.

BACKGROUND

Motor vehicles are equipped with airbags to ensure safety of occupants.

An airbag is designed so that, in a collision accident of a motor vehicle, a sensor, receiving an impact of the collision, becomes activated to cause a high-temperature and high-pressure gas to be generated within the airbag, and the airbag is instantly inflated by the gas to protect an occupant's face or forehead at the time of the collision.

Airbags are typically made by producing a base cloth in which a resin such as silicone is applied to or layered on a woven fabric cloth made of a plain woven fabric that uses a Nylon 6/6 filament yarn or a Nylon 6 filament yarn of 100 to 1000 dtex to improve characteristics such as heat resistance, flame retardance, or air shut-off property, and then cutting and sewing the cloth into a bag body.

Furthermore, there is a so-called "non-coated" cloth obtained for use by weaving synthetic fiber filament yarns of polyamide fiber, polyester fiber or the like in high density without providing resin so that the amount of air permeation through the textile is made small.

It is to be noted herein that the woven fabric for an airbag is required to have high strength and low air permeability since, in a collision accident of a motor vehicle, the airbag is to be instantly inflated to protect an occupant's face or forehead at the time of the collision.

Therefore, the woven fabric for airbags needs to be a woven fabric that employs yarns of higher strength and that is high in density compared to woven fabrics for ordinary clothing.

Typically, when such a high-density woven fabric is woven, the amount of movement of the weaving shed at the cloth fell from the most advanced position of the reed to the warp yarn send-out side becomes larger as the weft density becomes higher, due to woven fabric design, as in a plain woven structure where the warp yarns and the weft yarns are 470 dtex and the warp and weft woven fabric densities are 55 yarns per inch (2.54 cm) for both the warp and weft and the like.

Due to this, inconveniences at the time of weaving as mentioned in (a) to (d) below occur.

(a) At the time of reed beating, the woven fabric near the cloth fell undergoes a bumping phenomenon so that it becomes hard to obtain a woven fabric having a desired weft density.

(b) After the weft yarn is beaten, the weft yarn is cut at each of left and right end portions of the cloth fell by a cutter. At that time, the cut weft yarn loses a hold and becomes free, the weft yarn crimp at each of two selvage end portions of the base cloth becomes large and, therefore, the warp yarn crimp at each selvage end portion becomes smaller so that the warp yarn tension in both selvage portions declines. Therefore, the warp's holding force for the weft declines so that the weaving sheds at both selvage portions of the cloth fell recede. As a result, fluffing due to the warp yarn looseness in the selvage portions is induced so that weaving cannot be stably performed.

(c) If the weaving machine rotation speed is made high, a phenomenon in which the weaving sheds of the selvage end portions recede appears more conspicuously. Due to the warp yarn looseness in the base cloth selvage portions, a selvage waving in which a cloth length difference between the selvage portions and a central portion occurs and the selvage end portions become wavy occurs as an essential problem. A base cloth for airbags is cut, sewed, and then made into a bag body. To maximally effectively utilize the base cloth for airbags, a cutting pattern is designed such that, usually, even the selvage end portions or the vicinities thereof are used. Since ends of a cut piece easily unravel, occurrence of selvage waving in the vicinity of a selvage end portion causes poor cutting to occur so that a desired accurate shape as an airbag cannot be obtained and a necessary function will not be obtained.

(d) Selvage waving in a gray fabric compromises the processing passing property at the time of rolling and also in the subsequent scouring and setting steps, and also becomes a cause of occurrence of wrinkles. When resin coating is provided, the selvage waving compromises the processing passing property in the coating step, and also causes problems of occurrence of unevenness in the amount of application of the coating resin and wrinkles.

In relation to the foregoing inconveniences (a) to (d), as one of various attempts to prevent the selvage slack resulting from weaving, in particular, a method in which, in a base cloth for airbags made of a synthetic fiber woven fabric, the fineness of the warp yarns of the selvage portions of the woven fabric is finer than the fineness of the warp yarns of a main body portion of the base cloth has been proposed (Japanese Unexamined Patent Publication (Kokai) No. 10-236253). Furthermore, methods in which additional yarns are inserted besides binding yarns or the structure of the binding yarns is changed have been proposed (Japanese Unexamined Patent Publication (Kokai) No. 2001-355143, Japanese Unexamined Patent Publication (Kokai) No. 2002-212856, and Japanese Unexamined Patent Publication (Kokai) No. 2002-69790).

At this time when cost competitiveness is required, weaving machines are operated at increased speed and the width of an object woven fabric is increased. In response to this, however, when a high-density woven fabric is woven, the means as proposed above are not able to sufficiently tighten the weft yarns if the tension of the weft yarns at the time of being run is increased in connection with the increased speed of operation of the weaving machine. This results in a decline in the warp yarn tension in the selvage portions. Then, there is a problem that fluff occurs due to break of a single yarn of the warp, leading to an increased number of times of stop of the weaving machine and a decline in the weaving performance. Furthermore, there is also a problem of the selvage waving becoming great.

In view of the shortcomings of the related-art woven fabrics and production processes therefor, it could be helpful to provide a woven fabric and a process of producing the woven fabric in which when a high-density woven fabric is woven at high speed, recession of the weaving sheds in the selvage end portions is restrained and, when necessary, the selvage waving is lessened.

SUMMARY

We thus provide:

(1) A woven fabric characterized in that the woven fabric comprises a synthetic fiber multifilament yarn as a ground yarn, and in a selvage weave portion present in an end portion of the woven fabric: a binding yarn constructed of a filament having a fineness of 33 dtex or less; an additional yarn constructed of a filament having a fineness of 33 dtex or less; and a selvage-tightening yarn constructed of a multifilament having a total fineness that is 80% or greater of the total fineness of the ground yarn.

The woven fabric as described above preferably has a construction according to any one of constructions described in (2) to (6) below.

(2) The woven fabric according to the foregoing (1), characterized in that the filaments of 33 dtex or less that constitute the binding yarn and the additional yarn are each a monofilament.

(3) The woven fabric according to the foregoing (1) or (2), characterized in that the woven fabric is a woven fabric for an airbag base cloth.

(4) The woven fabric according to any one of the foregoing (1) to (3), characterized in that a width of the woven fabric is 160 cm or greater.

(5) The woven fabric according to any one of the foregoing (1) to (4), characterized in that a cover factor of the woven fabric is in a range of 1800 to 2500.

(6) The woven fabric according to any one of the foregoing (1) to (5), characterized in that the multifilament that constitutes the selvage-tightening yarn is a multifilament yarn that has a crimp.

Furthermore, the process of producing a woven fabric has a construction as described in (7) below.

(7) A process of producing a woven fabric which is the woven fabric according to any one of the foregoing (1) to (6) characterized in that the process is a process of producing the woven fabric comprising a synthetic fiber multifilament yarn as a ground yarn, by comprising to form a selvage weave portion present in an end portion of the woven fabric: using a filament having a fineness of 33 dtex or less in a binding yarn and an additional yarn; and performing weaving while inserting a multifilament having a total fineness that is 80% or greater of the total fineness of the ground yarn into the selvage weave portion as a selvage-tightening yarn.

The process of producing the woven fabric described above preferably has any one of constructions described in (8) to (11) below.

(8) The process of producing the woven fabric according to the foregoing (7), characterized in that the filaments of 33 dtex or less that constitute the binding yarn and the additional yarn are each a monofilament.

(9) The process of producing the woven fabric according to the foregoing (7) or (8), characterized in that the selvage-tightening yarn is a multifilament having a tensile strength of 1.0 to 7.0 cN/dtex, and is inserted into both selvage weave portions at a supply tension of 0.1 to 0.7 cN/dtex per total fineness.

(10) The process of producing the woven fabric according to any one of the foregoing (7) to (9), characterized in that the woven fabric is woven by using a water jet loom weaving machine as a weaving machine.

(11) The process of producing the woven fabric according to any one of the foregoing (7) to (10), characterized in that the woven fabric is woven, with rotation speed of the weaving machine being set to 700 rotations/minute or greater.

Our fabrics and methods can restrain the recess of the weaving sheds of the selvage end portions during the high-density woven fabric weaving. Furthermore, depending on the condition, the invention can reduce the selvage waving. In particular, when used as a base cloth for airbags, as a usage, we provide a woven fabric for a base cloth for airbags which is excellent in the processing passing property and the uniform application property in the scouring, setting and coating steps performed after the weaving, and which is excellent in cuttability and sewability.

We also provide a woven fabric that more clearly and certainly has the effects of the woven fabric as described above.

We further provide a process of producing a woven fabric which makes it possible to weave such an excellent woven fabric for a base cloth for airbags.

We still further provide a process of producing a woven fabric that has more clearly and certainly has the effects achieved by the process of producing the woven fabric as described above.

DETAILED DESCRIPTION

In our woven fabric, its ground is made of a synthetic fiber multifilament. As for a material of the synthetic fiber, for example, polyamide-based fiber, polyester-based fiber, aramid-based fiber, rayon-based fiber, polysulfone-based fiber, super high molecular weight polyethylene-based fiber, or the like can be used.

Among these, the polyamide-based fiber and the polyester-based fiber that are excellent in mass-productivity and economy are preferable.

As the polyamide-based fiber, there can be cited, for example, Nylon 6, Nylon 66, Nylon 12, Nylon 46, a copolymerized polyamide of Nylon 6 and Nylon 66, copolymerized polyamides obtained by copolymerizing Nylon 6 with polyalkylene glycol, dicarboxylic acid, amine and the like, among others. Nylon 6 fiber and Nylon 66 fiber are particularly excellent in strength, and are preferable.

Furthermore, as the polyester-based fiber, there can be cited, for example, fibers made of polyethylene terephthalate, polybutylene terephthalate and the like. The polyester-based fiber may also be fiber made of a copolymerized polyester obtained by copolymerizing polyethylene terephthalate or polybutylene terephthalate with an aliphatic dicarboxylic acid, such as isophthalic acid, 5-sodium sulfoisophthalate, adipic acid and the like, as an acid component.

Furthermore, these synthetic fibers may contain, to improve the productivity in the spinning and stretching steps and the processing step or improve characteristics, an additive such as a heat stabilizer, an antioxidant, a light stabilizer, a smoothing agent, an antistatic agent, a plasticizer, a thickener, a pigment, a flame retardant and the like. Furthermore, as for the sectional shape of a single fiber of the synthetic fiber, single fibers having a circular cross section and also those having a flat cross section can be employed. By employing a fiber whose cross section is flat, it becomes possible to pack the fiber at high density when in a woven fabric so that the spaces present between single fibers in the woven fabric become small. Therefore, if the structure of the woven fabric is the same, employment of the fiber whose cross section is flat can realize a reduction of air permeation to a small amount, which is required in use for airbags compared to when a yarn having a circular cross section and a similar fineness is used.

As for the shape of the flat cross section, when the sectional shape of the single fiber is approximated to an ellipse, the flatness defined as a ratio (D1/D2) between a major diameter (D1) and a minor diameter (D2) is preferred to be 1.5 to 4 and more preferably 2.0 to 3.5. Such a flat sectional shape may be not only a geometrically true ellipse, but also, for example, a rectangular shape, a rhomboid or a cocoon shape, and may be not only symmetrical but also an asymmetrical shape. Furthermore, the flat sectional shape may be a shape combining any of these shapes. Further, the flat sectional shape may be one that has as a basic shape any one of the foregoing shapes and has a protrusion or a recess or partially has a hollow portion.

It is normally preferable that the same synthetic fiber yarns be used as warp yarns and weft yarns. The same synthetic fiber yarns being used as warp yarns and weft yarns is that the warp/weft yarns are both made of the same kinds of polymers, the warp/weft yarns have the same single fiber fineness, and the warp/weft yarns have the same total fineness. The same kinds of polymers are polymers having main repetition units in common such as Nylon 66 polymers, polyethylene terephthalates and the like. For example, a combination of a homopolymer and a copolymerized polymer is also preferably used as the same kinds of polymers. Furthermore, adoption of a combination in which the presence/absence of a copolymerization component and, if copolymerization is performed, the kind and amount of copolymerization component are the same will eliminate the need to distinguish warp yarns and weft yarns, and is therefore preferable in terms of production control.

As for the synthetic fiber yarns used as ground yarns of the woven fabric, it is preferable to use a synthetic fiber filament whose single fiber fineness is 1 to 7 dtex. Having a single fiber fineness of 7 dtex or less brings about smaller spaces formed between single fibers in the woven fabric, and even further improves the packing effect of fiber so as to allow the amount of air permeation to be reduced, and therefore is preferable. Furthermore, this also attains an effect of decreasing the rigidity of the synthetic fiber filament so that the packaging property of the airbag improves, which is preferable.

The total fineness of the synthetic fiber yarns used as the ground yarns of the woven fabric is preferred to be 100 to 1000 dtex. Herein, the total fineness refers to the fineness of one of the weaving yarns that constitute the structure of the woven fabric. For example, when two yarns of 334 dtex and 96 filaments are doubled and used as one weaving yarn (warp yarn) as in an example described later, the total fineness is 668 dtex. Incidentally, the fineness is a value obtained by measuring a fineness based on corrected mass with a predetermined load of 0.045 cN/dtex according to JIS L 1013:2010 8.3.1 A method.

By setting the total fineness of the synthetic fiber yarn for use as the ground yarn to 100 dtex or greater, the strength of the woven fabric can be maintained. Furthermore, when the total fineness of the synthetic fiber yarn is less than 100 dtex, the weft yarns' being low in rigidity does not allow a curved structure of the warp yarns to be achieved to a great degree in the formation of the curved structure of the warp yarns described below so that there is a tendency that the contact length between the warp yarns and the weft yarns will not become great and the edgecomb resistance of fiber in the warp direction will not become sufficiently great, and so that a desired low degree of air permeation is sometimes not obtained. Furthermore, by setting the total fineness of the synthetic fiber yarns used as the ground yarns to 1000 dtex or less, the compactness at the time of packaging and the low air permeability can be maintained. The total fineness is preferred to be 200 to 700 dtex and, more preferably, 300 to 500 dtex. Having a total fineness within this range improves the strength, edgecomb resistance, low air permeation, flexibility and compact packaging property of the woven fabric in a well-balanced manner.

When the woven fabric is a woven fabric for an airbag base cloth, the tensile strength of fiber that constitutes the woven cloth, in both warp and weft, is preferred to be 8.0 to 9.0 cN/dtex and, more preferably, 8.3 to 8.7 cN/dtex, for the purpose of satisfying the mechanical characteristics required as the woven fabric for an airbag base cloth, and in terms of filature operation.

The structure of the woven fabric is not particularly constrained provided that the woven fabric is made up of the warp yarns and the weft yarns that are made of the same synthetic fiber yarn as mentioned above. However, for use for airbags, the woven fabric of plain weave is particularly preferable from the viewpoint of a requirement that the airbags be capable of being compactly packaged, which is a necessary characteristic. The weaving density can vary depending on whether the woven fabric is a woven fabric subjected to resin processing or a woven fabric not subjected to resin processing or depending on the fineness of the weaving yarns. However, the cover factor is preferred to be 1800 or greater and 2500 or less in view of achieving both low air permeability and high edgecomb resistance. Generally, if the cover factor is as great as 1800 or greater and 2500 or less, the recession of the weaving sheds of the selvage portions, which is a problem during weaving, becomes large and selvage waving becomes conspicuous so that, particularly, producing a woven fabric by performing weaving through the use of a selvage-tightening yarn that is adopted is effective. That is, the process of producing the woven fabric can be effectively adopted for production of a woven fabric that has a cover factor outside the aforementioned range. In particular, adopting the production process in the production of a woven fabric whose cover factor is 1800 or greater and 2500 or less achieves conspicuous effects, and is therefore preferable.

If the targeted cover factor reaches a weft beating limit in relation to the woven fabric design and the weaving, the recession of the weaving sheds becomes large at the weaving machine reed beating portion and, particularly, the selvage portions so that the warp looseness causes fluff to be produced and therefore weaving cannot be continued. The cover factor of the woven fabric mentioned above refers to a sum obtained by calculating, for each of warp and weft, the product of the square root of the yarn thread fineness and the number of yarn threads per inch, and summing the products. That is, when the warp total fineness is Dw (dtex), the weft total fineness is Df (dtex), the weaving density of the warp yarns is Nw (yarns/2.54 cm), and the weaving density of the weft yarns is Nf (yarns/2.54 cm), the cover factor (CF) of the woven fabric is expressed by the following expression.

$$CF=(Dw\times0.9)^{1/2}\times Nw+(Df\times0.9)^{1/2}\times Nf$$

It is preferable that an amount of bow obtained as an average for a total of 10 points of location of the sampling of the woven fabric performed at every 1 m in the longitudinal direction be 12 mm or less. When the amount of bow is large, the selvage waving of the base cloth becomes great so that unevenness in the amount of application of the coating resin may sometimes occur. Furthermore, the difference in the amount of air permeation between a central portion and the selvage portions of the base cloth becomes great so that deviation from the base cloth standard values occurs. Incidentally, the "amount of bow" means the distance from a straight line connecting two end portions where a weft yarn exists to a curved line that extends along the weft yarn. Incidentally, what represents this distance is the length of a perpendicular to the straight line connecting both end portions.

In addition to the binding yarns and the additional yarns, selvage-tightening yarns are beaten into the selvage portions during weaving. The binding yarns and the additional yarns are used to form the selvages of the woven fabric, and the selvage-tightening yarns are inserted into selvage end portions near both selvage end portions of the woven fabric. The "selvage end portion" of the woven fabric refers to outermost end portions at left and right where selvage portions are formed, and the "selvage weave portion" refers to a portion in which a woven fabric structure that uses a binding yarn and an additional yarn as warp yarns is formed.

The "binding yarn" is also called leno, and forms a selvage by tightening the weft yarns at each of both warp end portions to prevent selvage unraveling. To form a selvage, a planetary gear is typically used, and more preferably a planetary gear twisting method is employed. Of course, there are other methods as well. The material, kind and fineness of the binding yarns, and the kind and weaving density of the ground yarns are selected as appropriate for use. As for the number of yarns used, it is preferable to use two or more yarns for each of both end portions and, preferably, two yarns for each. In general, it is advisable to use a monofilament that is excellent in the selvage tightening performance, but multifilaments can also be used. As for the material of the binding yarns, the same Nylon as the ground yarn material is preferable, but polyester can also be used.

As for the fineness of the binding yarns, it is important to use binding yarns whose fineness is 33 dtex or less. If the fineness of the binding yarns is greater than 33 dtex, the selvage portions of the base cloth may sometimes experience unraveling; furthermore, when the base cloth of a great length is rolled into a roll, high selvages result, making a cause of wrinkles Preferably, the fineness of the binding yarns is 22 dtex or less and 5 dtex or greater.

The "additional yarn" is used for the purposes of forming selvages of the base cloth and preventing selvage unraveling and selvage tear, similarly to the binding yarn, and refers to a yarn that is disposed at each of warp two side surface portions and is used as assistance to the binding yarns. However, a planetary device is not used. The material, kind and fineness of the additional yarns can also be selected as appropriate for use according to the kind and weaving density of the ground yarns. Similarly to the aforementioned binding yarns, it is preferable to employ for the additional yarns a monofilament that is excellent in selvage tightening. As for the number of additional yarns if any used, two to ten yarns may be used for each of both end portions. As for the fineness of the additional yarns, it is important to use additional yarns whose fineness is 33 dtex or less. If the fineness of the additional yarns is greater than 33 dtex, the selvage portions of the base cloth may sometimes experience unraveling. Furthermore, when the base cloth of a great length is rolled into a roll, high selvages result, becoming a cause of wrinkles Preferably, the fineness of the additional yarns is 22 dtex or less and 5 dtex or greater.

When monofilaments are employed as these binding yarns and additional yarns, use of processed yarns having crimps sometimes becomes a cause of occurrence of high selvages, selvage hanging and wrinkles as the woven base cloth is rolled up into a roll and the roll diameter of the roll increases, and therefore is not preferable. It is advisable to use yarns having no crimp, that is, non-processed yarns, as binding yarns and additional yarns. However, if there is no occurrence of a high selvage, selvage hanging or a wrinkle, processed yarns having crimps may be used. Incidentally, when multifilaments are employed as binding yarns and additional yarns, it is preferable to employ processed yarn such as crimped yarns.

The material of the additional yarns is preferred to be the same as the material of the ground yarns. Since the ground yarns are often of Nylon particularly in the case of use for airbags, the material of the additional yarns can be said to be preferred to be Nylon. However, polyester can also be used.

The selvage-tightening yarns are passed through the healds and the reed by a supply device that is separate from the one used for the binding yarns or the additional yarns. As for the selvage-tightening yarns, it is preferable that 10 or fewer processed yarns of polyester or Nylon having crimp and, preferably, 2 or greater and 10 or fewer processed yarn be inserted into both selvage end portions of the warp yarns. As a consequence, the selvage-tightening yarns are woven while being inserted into the selvage weave portions of both selvage end portions of the woven fabric for the purpose of restraining the recession of the weaving shed at the cloth fell and minimizing the amount of bow of the base cloth.

The structure of the woven fabric is preferred to be a plain weave, but may also be a twill weave, a satin weave and the like according to characteristics required of the base cloth. Depending on the woven fabric structure, the heald-threading sequence and the number of yarns passed through the reed are determined as appropriate. The selvage-tightening yarns cause the yarns threaded through the healds to undergo the opening movements similarly to the warp yarns, and hold the weft yarns. The selvage-tightening yarns are supplied from the vicinity of a warp beam provided in the rear of the weaving machine, with load applied thereto by a spring type tensioner, and are passed through the opening healds. The selvage-tightening yarns are threaded through the reed, together with the selvage end portions of the ground yarns. After the weft yarn is run by high-pressure water or pressured air and then is beaten up by the reed, the weft yarn is cut by the cutter, and at that time, the weft yarn becomes free. The selvage fringes of end portions of the weft yarn tend to return toward the ground side, but are restrained by the selvage-tightening yarns holding the selvage fringes. Then, the weft yarn crimp of the selvage portions becomes smaller, and the crimp of the warp yarns becomes greater. Therefore, the warp yarn tension becomes higher and the holding force for weft yarns increases so that the recession of the weaving sheds of the selvage portions becomes smaller. Hence, the cloth length difference between the central portion and the selvage end portions of the base cloth becomes smaller so that the amount of bow becomes smaller and the selvage waving will be bettered.

Generally, when weaving is performed without using selvage-tightening yarns as in the related art, the weaving shed at the cloth fell is represented by the distance from a temple distal end to the weaving shed. When the weft yarn is run by high-pressure water or pressured air, high tension acts on the weft yarn. Therefore, when the weft yarn is cut by the cutter after the weft yarn is beaten by the reed, the free end portion of the weft yarn returns to the ground side. Due to the decline in the weft yarn tension in the selvage portions of the base cloth, the crimp of the weft yarn increases, and conversely the warp yarn crimp in the selvage portions decreases. Therefore, the warp yarn tension in the selvage portions becomes low. Therefore, the holding force exerted on the weft yarn by the warp yarns disappears, and the recession of the weaving shed becomes great so that the amount of bow of the base cloth increases, leading to deterioration of the physical properties of the base cloth and the selvage waving.

As for the supply of selvage-tightening yarns, it is usual practice to supply selvage-tightening yarns from a triangular cone or a paper tube, without using a planetary device or a bobbin, as stated above. In particular, it is preferable to employ a spring washer to manage the tension when the selvage-tightening yarns are supplied.

It is important that the material of the selvage-tightening yarns be a multifilament. In particular, it is preferable to use processed multifilament yarns that have been subjected to crimping processing. For example, processed yarns subjected to false-twisting processing, and the like are yarns that are preferably used. The kind of the selvage-tightening yarns is not particularly constrained. However, polyester or Nylon is generally easily available and similar in yarn characteristics to the ground yarns, and is therefore preferable. Particularly, it is preferable that the selvage-tightening yarns be crimp-processed yarns of a multifilament, because moderate crimping lessens changes in the tension of the selvage-tightening yarns during weaving. The multifilament yarn is a yarn that is provided as one yarn by combining two or more filaments, and that is solely wound up on one spool body. The single yarn fineness of the processed yarns used as the selvage-tightening yarns are not particularly constrained. It is important that the total fineness of the yarns used as the selvage-tightening yarns be 80% or greater of the ground yarn total fineness, from the viewpoint of allowing maximum realization of the desired effects. A reason for this is that if the total fineness of the yarns used as the selvage-tightening yarns is below 80%, warp yarn looseness in the selvage portions occurs so that the weaving becomes difficult. Furthermore, it is preferable that the total fineness of the yarns used as the selvage-tightening yarns be 100% or greater of the ground yarn total fineness. Furthermore, it is preferable that the total fineness of the yarns used as the selvage-tightening yarns be 300% or less and, furthermore, 200% or less of the ground yarn total fineness.

The ground yarn refers to a weaving yarn that forms a main body of the woven fabric that is other than the selvage portions. Furthermore, the tensile strength of the selvage-tightening yarns is not particularly limited. However, the lower-limit side is preferred to be 1.0 cN/dtex, that is, the tensile strength thereof is preferred to be 1.0 cN/dtex or greater, and the upper-limit side is preferred to be 7.0 cN/dtex, that is, the tensile strength thereof is preferred to be 7.0 cN/dtex or less.

The number of yarns used as the selvage-tightening yarns is preferred to be 4 to 8 yarns for each of the selvage end portions on both sides, from the viewpoint of allowing maximum realization of the desired effects.

As for the selvage-tightening yarns, it is preferable to thread one selvage-tightening yarn through one of the healds that open the warp yarns. For example, when the warp fineness (ground yarn total fineness) is 470 dtex, the total fineness of the selvage-tightening yarns is 660 dtex, and the number of selvage-tightening yarns is four, it is preferable that one selvage-tightening yarn be passed through one of the healds that open the warp yarns, and every two of the yarns having fineness of 660 dtex be passed through one reed split.

When multifilaments having a fineness of less than 80% of the ground yarn total fineness are employed as selvage-tightening yarns, a plurality of multifilaments may be used as one warp yarn as described below to have, as a total fineness of the plurality of multifilaments combined, a fineness that is less than 80% of the ground yarn total fineness.

For example, when multifilaments whose fineness is 330 dtex are employed as selvage-tightening yarns, with the warp fineness (ground yarn total fineness) being 470 dtex, it is preferable that the number of multifilaments used be eight, and two selvage-tightening yarns be doubled so that the total fineness is 660 dtex, for one of the healds that open the warp yarns, and every two of the yarns of 660 dtex be passed through a reed split. When two selvage-tightening yarns are threaded through one heald, the two yarns may be threaded therethrough after being doubled by a method of multiple winding or the like as mentioned above. Instead of being paralleled and multiple-wound beforehand, a plurality of selvage-tightening yarns may be threaded through one heald as a plurality of warp yarns are placed side by side. In particular, since the weft yarns can be sufficiently tightened without a need to perform multiple winding, decrease of the warp yarn tension of the selvage portions can be restrained and the recession of the weaving sheds of the selvage end portions can be restrained, so that the selvage waving can be lessened. In a woven fabric obtained by threading doubled or paralleled selvage-tightening yarns through a heald, if in disassembly of the woven fabric, two selvage-tightening yarns, that is, a plurality of the yarns, in a paralleled state simultaneously interlace with weft yarns, the plurality of yarns combined is considered as one warp yarn.

Depending on the state of the weaving sheds of the selvage end portions during weaving, it is permissible to thread one selvage-tightening yarn through one reed split. If four to eight selvage-tightening yarns are all passed through one split, there is a risk of the selvage portions becoming high when the base cloth is rolled up into a roll-shaped rolled body, which will be a cause of selvage wrinkle. When a selvage-tightening yarn is supplied, it is critical to manage the supply tension of the yarn, via a tensioner of a spring type, a washer type or the like. The supply tension of the selvage-tightening yarns is preferred to be supplied at 0.1 to 0.7 cN/dtex per fineness of the selvage-tightening yarn. Incidentally, the "fineness of the selvage-tightening yarn" refers to the fineness of each multifilament used in the selvage-tightening yarn, and the "total fineness of the selvage-tightening yarn" is the total fineness of selvage-tightening yarns that together interlace with weft yarns in a disassembly of the woven fabric, and typically corresponds to the total fineness of the multifilaments that are threaded through one heald. For example, when the total fineness of selvage-tightening yarns is 330 dtex, a preferred supply tension is 33 to 231 cN. If the supply tension of the selvage-tightening yarns is less than 0.1 cN/dtex per total fineness, the force of holding the weft yarns is weak so that the recession of the weaving sheds of the selvage end portions during weaving becomes great and, due to the warp loosening of the selvage portions during weaving, fluff is generated. Thus, weaving becomes difficult. When the supply tension of the selvage-tightening yarns is greater than 0.7 cN/dtex per total fineness, it sometimes happens that the supply tension is excessively high and therefore causes occurrence of selvage tear and selvage hanging of the base cloth, so that deterioration in quality level results. Therefore, the supply tension of the selvage-tightening yarns being greater than 0.7 cN/dtex per total fineness is not preferable.

The selvage-tightening yarns are preferred to be ones whose crimp rate is 40% or less. The crimp rate indicates the shape restorability of crimp in water at a normal temperature of 15 to 25° C. If the crimp rate of the selvage-tightening yarns is 40% or greater, it sometimes happens that after the scouring/setting processing, the difference in contraction between the ground yarns and the selvage-tightening yarns causes selvage hanging to occur in the base cloth selvage portions. A preferred crimp rate is 2% or greater and 40% or less.

Since the woven fabric for an airbag base cloth allows, at the time of its production, high-speed operation of a weaving machine, it is preferable to weave the woven fabric by a jet loom. Particularly, a water jet loom is preferable. The water jet loom weaving machine runs weft yarns by a compressed water at a high pressure and therefore, compared with an air jet loom weaving machine and a rapier weaving machine, tends to have a high running tension of the weft yarns to be required to have a further improvement in the weft yarn-holding force in the selvage portions. Hence, at the time of high-speed operation or a woven fabric of a great width, the effect achieved by use of added yarns becomes more conspicuous.

When the woven fabric is for an airbag base cloth, it is preferable that after the woven fabric is woven by a water jet loom weaving machine, the base cloth be subjected to scouring/setting processing to dry the base cloth and/or remove an oil agent adhering to original yarns and remove wrinkles. As for the woven fabric for an airbag base cloth, it is preferable that the base cloth width after weaving be 160 cm or greater because this makes the effects of the production process conspicuous. In considering the cutting-time loss at the time of producing airbags, it is more preferable that the base cloth width be 180 cm or greater. The upper limit of the base cloth width is preferred to be 240 cm or less. The "base cloth width" is a width of a main body portion of the woven fabric excluding the selvage portions.

Next, the process of producing a woven fabric for an airbag base cloth will be described.

In the process of producing the woven fabric for an airbag base cloth, synthetic fiber filament yarns are employed as warp yarns and weft yarns, and the warp yarns whose fineness is in accordance with the woven fabric design are arranged for the warp, and set in a weaving machine, and preparation of the weft is similarly performed. As for the synthetic fiber filament yarn threads used as the warp yarns and the weft yarns, use of the same yarns is preferable in view of later steps, in terms of quality of the base cloth. As for the weaving machine, use of a water jet loom weaving machine lessens the occurrence of warp fluff during weaving, and makes high-speed weaving relatively easy and the productivity high, and therefore is preferable.

At the time of weaving by a water jet loom weaving machine, it is preferable to select a weft length measurement device equipped with restrained run. For example, it is preferable to employ a water jet loom weaving machine that has a device that winds up a pick of weft yarn on a length measurement drum by guide rotation or a device that winds up a pick of weft yarn by drum rotation of a length measurement device and air sent by a blower. A free drum type length measurement device that is mainly used in an air jet loom weaving machine applies brake by an engaging pin when a pick of weft yarn completes running so that the tension that acts on the weft yarn is great and the recession of the weaving sheds of the selvage portions is great. Therefore, if the free drum type length measurement device is used, its effect is poor. The restrained run refers to the timing at which weft brake occurs at the time of end of release, from a length measurement device, of the wound weft yarn that has been obtained by winding a pick of weft yarn on a drum of the length measurement device by guide rotation or drum rotation or by air sent by a blower. With the restrained run, the recession of the weaving sheds of the selvage portions is reduced compared to the free drum type without the restrained run.

The process of producing the woven fabric for an airbag base cloth is preferred to be performed with the warp yarn tension being adjusted to 50 to 250 cN/yarn and, more preferably, 100 to 200 cN/yarn. By adjusting the warp yarn tension into such a range, the spaces between single fibers in a yarn bundle of multifilament yarns that constitute the woven fabric can be reduced so that the amount of air permeation can be lessened. Furthermore, after the weft yarn is beaten, the warp yarns tensioned as described above force the weft yarn to bend so that the structure-restraining force of the woven fabric in the weft direction is enhanced and the anti-yarn slippage property of the woven fabric improves. Thus, air leakage due to yarn slippage in a sewed portion at the time of forming a bag body as an airbag can be reduced. If the warp yarn tension is small, the contact area between the warp yarns and the weft yarns in the woven fabric cannot be increased, and the edgecomb resistance cannot be obtained to a desired extent, and the effect of reducing the inter-single fiber spaces is small, making it less likely to obtain low air permeability.

If the warp yarn tension is excessively great, the warp yarns tend to produce fluff due to fretting at heald mails. As a concrete method of adjusting the warp yarn tension into the aforementioned range, there can be cited a method in which the beating speed of the weft yarn is adjusted, besides adjusting the warp send-out speed of the weaving machine. Whether the warp yarn tension is actually within the aforementioned range during weaving can be checked by, for example, measuring the tension that acts per warp yarn by a tension measurement meter at an intermediate point between the warp beam and the back roller during operation of the weaving machine. Furthermore, it is preferable to provide a difference between the upper yarn sheet tension and the lower yarn sheet tension at the warp opening.

As an adjustment method, there is, for example, a method in which a difference between the running line length of the upper yarns and the running line length of the lower yarns by installing the back roller level to, for example, about 10 to 30 mm higher than a generally horizontal position and the like. Furthermore, as other methods of providing a difference between the tension of the upper yarns and the tension of the lower yarns, there is, for example, a method in which a cam drive system is adopted in an opening device, and the dwell angle of one group of the upper yarns and the lower yarns is made at least 100 degrees greater than that of the other group of yarns. The tension of the group of yarns with the increased dwell angle is higher. As for the temple of the weaving machine, if the cover factor is 2000 or greater, which means a high-density woven fabric, it is preferable to use a bar temple. When the cover factor is 1700 or less, a ring temple may be selected. If the bar temple is used, reed beating can be performed while the entire cloth fell, including both end portions of the base cloth, is held so that the looseness of the warp selvage portions betters compared with the ring temple. Furthermore, the use of the bar temple also makes it possible to lessen the spaces between synthetic fiber filaments and, as a result, the low amount of air permeation and the anti-yarn slippage property improve.

Next, if there is a need, processing such as scouring or heat setting, is performed after the weaving step. When a particularly small amount of air permeation is required, resin or the like may be applied to a base cloth surface or a film may be stuck thereto so that the woven fabric may be provided as a coated cloth. An airbag produced by using the woven fabric for an airbag base cloth is one obtained by sewing the woven fabric for an airbag base cloth into a bag shape and attaching to it ancillary appliances such as an inflator. An airbag produced by using the woven fabric for an airbag base cloth can be used as an airbag for a driver's seat, a passenger's seat, a rear seat, a side surface, a knee, a ceiling and the like. Particularly, airbags produced by using the woven fabric for an airbag base cloth are suitable to be used as airbags for the driver's seat and the passenger's seat, which are required to produce a great restraining force.

The woven fabric can be made into an airbag by designing a cutting pattern, cutting the woven fabric, and sewing it into a bag body. Incidentally, the cutting of the woven fabric subjected to resin processing is usually performed by stacking a plurality of sheets of the woven fabric subjected to resin processing and punching them out with a knife. Furthermore, in a non-coated base cloth, the punching-cutting with a knife is likely to result in an unraveling end of a cut piece. Therefore, usually, non-coated base cloths are cut, one at a time, by a laser cutter. However, as for the woven fabric, since there is no selvage waving in the vicinities of the selvage end portions, the woven fabric can be cut into shapes as designed, and also is easy to sew. Therefore, the airbag obtained by using the woven fabric can be finished, with a configuration of an airbag being exactly as designed, and with an accurate configuration, and can also provide a functionally excellent airbag that has a high bursting strength or the like. Furthermore, since the selvage waving is small, the waste loss of the woven fabric is small and the woven fabric can be utilized maximally effectively. Thus, the airbag obtained by using the woven fabric is also advantageous in terms of cost.

EXAMPLES

Hereinafter, the woven fabric and the process of producing the woven fabric will be specifically described with reference to examples.

Incidentally, various physical property values used in the description are those based on the measurement methods described below.

Measurement Methods (1) Amount of Bow

The distance from a straight line connecting both end portions where a weft yarn was present to a curved line extending along the weft yarn was measured at 10 points at intervals of 1 m in the longitudinal direction. What represents this distance is the length of a perpendicular to the straight line connecting both end portions. If this value is large, it means that the recession of the selvage end portions is large.

(2) Thickness of Woven Fabric

According to JIS L 1096:(1999) 8.5, at five different locations on each sample, the thickness was measured through the use of a thickness measuring machine after a wait for 10 seconds for the purpose of stabilization of the thickness under a pressure of 23.5 kPa, and then an average value was calculated.

(3) Weaving Density of Warp Yarns/Weft Yarns

Measurement was performed on the basis of JIS L 1096: (1999) 8.6.1. Each sample was placed on a flat table, and unnatural wrinkles and tension were removed. Then, at five different locations, the numbers of warp yarns and weft yarns in sections of 2.54 cm were counted, and average values for the warp and the weft were calculated.

(4) Weight of Woven Fabric

According to JIS L 1096:1999 8.4.2, three test pieces of 20 cm×20 cm were collected, and their masses (g) were measured, and an average thereof was expressed by mass per 1 m² (g/m²).

(5) Tensile Strength

According to JIS K 6404-3 6. test method B (strip method), five test pieces were collected with respect to each of the warp direction and the weft direction, and the width of each test piece was adjusted to 30 mm by removing yarns from both sides of the width. Using a constant speed strain type tester, each test piece was pulled at a grip interval of 150 mm and a pulling speed of 200 mm/min until the test piece broke. The maximum loads before the break occurred were measured, and an average value was calculated with respect to each of the warp direction and the weft direction.

(6) Elongation at Break

According to JIS K 6404-3 6. test method B (strip method), five test pieces were collected with respect to each of the warp direction and the weft direction, and the width of each test piece was adjusted to 30 mm by removing yarns from both sides of the width. Marked lines at an interval of 100 mm were provided in a central portion of each of the test pieces. Using a constant speed strain type tester, each test piece was pulled at a grip interval of 150 mm and a pulling speed of 200 mm/min until the test piece broke. The distance between the marked lines when the break occurred was read, and the elongation at break was calculated by the expression below. Then, an average value was calculated with respect to each of the warp direction and the weft direction.

$$E=[(L-100)/100]\times 100$$

where E is the elongation at break (%) and L is the distance (mm) between the marked lines at the time of break.

(7) Tear Strength

In accordance with JIS K 6404-4 6. test method B (single tongue method), five test pieces having a long side of 200 mm and a short side of 76 mm were collected in each of the warp direction and the weft direction, and a cut of 75 mm at right angle to a short side of each test piece was made at the center of the short side. Using a constant speed strain type tester, each test piece was torn at a grip interval of 75 mm and a pulling speed of 200 mm/min until the test piece was fully pulled. The tear load at that time was measured. From a chart record line of tear loads obtained, the three largest-value points were selected in the descending order from the maximum points excluding the initial peak, and an average value thereof was taken. Finally, an average value was calculated with respect to each of the warp direction and the weft direction.

(8) Amount of Air Permeation

In accordance with JIS L 1096:1999 8.27.1 A method (Frajour type method), the amount of air permeation at the time of a test with a test differential pressure of 19.6 kPa was measured. Test pieces of about 20 cm×20 cm were collected from five different locations of each sample. Each test piece was attached to an end of a cylinder having an opening diameter of 100 mm, and was fixed so that there would be no air leakage from the attachment site. Using a regulator, the test differential pressure was adjusted to 19.6 kPa. The amount of air permeating through the test piece at that time was measured by a flow meter. An average value with respect to the five test pieces was calculated.

(9) Edgecomb Resistance

According to ASTM D6479-02, measurement was performed.

(10) Warp Yarn Tension

Using a Check Master (registered trademark) (type: CM-200FR) made by Kanai Kouki (K.K.), the tension acting per warp yarn in a central portion between a back roller and a warp beam during operation of a weaving machine was measured.

The tension of the upper yarns/the tension of the lower yarns at the warp opening was measured.

The weaving machine was stopped in a state where the warp yarns form an opening. Between the back roller and the heddles (which is, if a guide roll is disposed between the back roller and the heddles, between the guide roll and the heddles instead), the tension that acted per warp yarn at the upper side was measured as a tension of the upper yarns by a tension measuring machine. Furthermore, in a similar manner, the tension that acted per warp yarn at the lower side was measured as a tension of the lower yarns.

(11) Crimp Rate

A reel of a 10-turn winding at an initial load of 0.088 cN/dtex was made. This reel was detached and left standing for 24 hours. The reel, with a load corresponding to 0.088 cN/dtex applied, was dipped in water at a normal temperature of 15 to 25° C., and the reel length Lo two minutes later was measured. Next, in water, the load corresponding to 0.088 cN/dtex was released and replaced with a load corresponding to 0.0018 cN/dtex, and the reel length L1 two minutes later was measured. A crimp rate was calculated by the following expression.

Crimp rate (%)={($L0$–$L1$)/$L0$}×100

(12) Presence/Absence of Occurrence of Selvage Waving of Base Cloth

Each woven base cloth was spread on a table, and the heights of both end portions were measured at increments of 1 mm (quantities smaller than 1 mm were rounded off). Evaluation was determined by using the selvage waving height as a magnitude. A four-level evaluation was adopted in which a height of less than 8 mm was "excellent", a height of 8 mm or greater and 10 mm or less was "good", a height of 11 mm or greater and 12 mm or less was "fair", and a height of 13 mm or greater was "no good". These levels are represented in Table 1 as follows: "excellent" by "⊙", "good" by "○", "fair" by "Δ", and "no good" by "x".

Example 1

Warp Yarns, Weft Yarns

Synthetic fiber multifilaments made of Nylon 6/6 and having a circular sectional shape, with a single fiber fineness of 6.52 dtex, the number of filaments being 72, a total fineness of 470 dtex, no twist provided, a strength of 8.5 cN/dtex, and an elongation of 23.5%, were prepared.

Weaving

Employing the yarns mentioned above were used for warp yarns and weft yarns as ground yarns and using a water jet loom weaving machine, a woven fabric was woven, with the reed threading width being 227 cm, the cover factor being 2213, the warp yarn tension during weaving being 180 cN/yarn, the weaving machine rotation speed being 800 rpm, the warp density being 54 yarns/2.54 cm, and the weft density being 54 yarns/2.54 cm.

At that time, as selvage-tightening yarns for both selvage portions, there was adopted a construction in which four yarns for each of left and right were supplied from paper tubes, and a spring washer was employed to manage the tension when the yarns were supplied. Every two false-twisted polyester yarns of 334 dtex and 96 filaments having a crimp rate of 30% were drawn from the vicinity of the warp beam in the rear of the weaving machine and doubled to form a yarn having a total fineness of 668 dtex. Four of such yarns were used. Every two of the false-twisted polyester yarns were threaded through healds and through a reed split, in a straight draw manner.

The supply tension of the selvage-tightening yarns was adjusted to 100 cN, which was 0.15 cN/dtex per total fineness of the selvage-tightening yarns.

As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were used similarly to the binding yarns. Six of such additional yarns were drawn along each of both warp end portions and passed through the healds at the warp end portion and through the reed. A bar temple was used between the reed beating portion and the friction roller. The timing of contact of the reed and the weaving shed was as shown in Table 1.

In weaving, the recession of the weaving shed in the selvage portions was able to be restrained to a small extent. That is, we found that a high-density airbag base cloth, with the reed threading width being 200 cm or greater and the cover factor being 2000 or greater can be woven at 800 rpm, and while restraining the recession of the weaving shed at the selvage end portions, and with a reduced amount of selvage waving, and furthermore, the state of selvage tightening is uniform and good.

Heat Setting

Next, using a pin tenter dryer, this woven fabric was subsequently subjected to heat setting processing at 180° C. for 1 minute under a dimension restriction of a width input rate of 0% and an overfeed rate of 0%.

As for the obtained woven fabric for airbags, the amount of bow of the base cloth was 8 mm, the tensile strength (warp/weft) in the base cloth physical property was 766/784 N, the elongation at break (warp/weft) was 35.5/25.6%, the tear strength (warp/weft) was 271/268 N, the amount of air permeation of the base cloth was 95.6 L/m$^2$, and the edgecomb resistance value (warp/weft) was 329/319 N.

Example 2

Warp Yarns, Weft Yarns

Synthetic fiber multifilaments made of Nylon 6/6 and having a circular sectional shape, with a single fiber fineness of 6.52 dtex, the number of filaments being 72 yarns, a total fineness of 470 dtex, no twist provided, a strength of 8.5 cN/dtex, and an elongation of 23.5%, were employed as warp yarns and weft yarns.

Weaving

Employing the yarns mentioned above were used for warp yarns and weft yarns and using a water jet loom weaving machine, a woven fabric was woven, with the reed threading width being 227 cm, the cover factor being 2213, the warp yarn tension during weaving being 180 cN/yarn, the weaving machine rotation speed being 800 rpm, the warp density being 54 yarns/2.54 cm, and the weft density being 54 yarns/2.54 cm.

At that time, as selvage-tightening yarns for both selvage portions, there was adopted a construction in which four yarns for each of left and right were supplied from paper tubes, and a spring washer was employed to manage the tension when the yarns were supplied. Every two of the false-twisted polyester yarns of 334 dtex and 96 filaments having a crimp rate of 30% were drawn from the vicinity of the warp beam in the rear of the weaving machine and doubled to form a yarn having a total fineness of 668 dtex. Every two of the false-twisted polyester yarns were threaded through healds and through a reed split, in a straight draw manner. The supply tension of the selvage-tightening yarns was adjusted to 100 cN, which was 0.15 cN/dtex per total fineness of the selvage-tightening yarns.

As binding yarns, multifilaments of 33 dtex were used. Two of such binding yarns were drawn along each of both warp end portions from a planetary device and passed through the healds at the warp end portion and through the reed. As for additional yarns, multifilaments of 33 dtex were also used. Six of such additional yarns were drawn along each of both warp end portions and passed through the healds at the warp end portion and through the reed.

A bar temple was used between the reed beating portion and the friction roller. The timing of contact of the reed and the weaving shed was as shown in Table 1. The recession of the weaving shed in the selvage portions was able to be restrained to a small extent. Therefore, we found that a high-density airbag base cloth, with the reed threading width being 200 cm or greater and the cover factor being 2000 or greater, which has been unable to be woven, can be woven at 800 rpm and while restraining the recession of the weaving shed at the selvage end portions, and with a reduced amount of selvage waving. As for the selvage tightening state, slight unraveling was observed, but was at a level where there is practically no problem.

Heat Setting

Subsequently, under the same conditions as in Example 1, the heat setting processing was performed.

As for the obtained woven fabric for airbags, the amount of bow of the base cloth was 8 mm, the tensile strength (warp/weft) in the base cloth physical property was 753/771 N, the elongation at break (warp/weft) was 34.4/24.1%, the tear strength (warp/weft) was 260/255 N, the amount of air permeation of the base cloth was 88.3 L/m$^2$, the edgecomb resistance value (warp/weft) was 338/331 N. Thus, the woven fabric had good physical properties.

Example 3

Warp Yarns, Weft Yarns

Synthetic fiber multifilaments made of Nylon 6/6 and having a circular sectional shape, with a single fiber fineness of 3.45 dtex, the number of filaments being 136 yarns, a total fineness of 470 dtex, no twist provided, a strength of 8.6 cN/dtex, and an elongation of 24.7%, were employed as warp yarns and weft yarns.

Weaving

Employing the yarns mentioned above were used for warp yarns and weft yarns, a woven fabric was woven by a water jet loom weaving machine, with the reed threading width being 227 cm, the cover factor being 2213, the warp yarn tension during weaving being 180 cN/yarn, the weaving machine rotation speed being 800 rpm, the warp density being 54 yarns/2.54 cm, and the weft density being 54 yarns/2.54 cm.

At that time, as selvage-tightening yarns for both selvage portions, there was adopted a construction in which four yarns for each of left and right were supplied from paper tubes, and a spring washer was employed to manage the tension when the yarns were supplied. Every two of the false-twisted polyester yarns of 334 dtex and 96 filaments having a crimp rate of 30% were drawn from the vicinity of the warp beam in the rear of the weaving machine and doubled to form a yarn having a total fineness of 668 dtex. Every two of the false-twisted polyester yarns were threaded through healds and through a reed split, in a straight draw manner. The supply tension of the selvage-tightening yarns was adjusted to 100 cN, which was 0.15 cN/dtex per total fineness of the selvage-tightening yarns.

As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were also used. Six of such additional yarns were drawn along each of both warp end portions and passed through the healds at the warp end portion and through the reed.

A bar temple was used between the reed beating portion and the friction roller. The timing of contact of the reed and the weaving shed was as shown in Table 1. The recession of the weaving shed in the selvage portions was able to be restrained to a small extent. Therefore, we found that a high-density airbag base cloth, with the reed threading width being 200 cm or greater and the cover factor being 2000 or greater, which has been unable to be woven, can be woven at 800 rpm and while restraining the recession of the weaving shed at the selvage end portions, and with a reduced amount of selvage waving, and furthermore, the state of selvage tightening is uniform and good.

Heat Setting

Under the same conditions as in Example 1, the heat setting processing was performed.

As for the obtained woven fabric for airbags, the amount of bow of the base cloth was 8 mm, the tensile strength (warp/weft) in the base cloth physical property was 744/773 N, the elongation at break (warp/weft) was 34.8/24.7%, the tear strength (warp/weft) was 266/257 N, the amount of air permeation of the base cloth was 89.7 L/m$^2$, the edgecomb resistance value (warp/weft) was 342/327 N. Thus, the woven fabric had good physical properties.

Example 4

Warp Yarns, Weft Yarns

Synthetic fiber multifilaments made of Nylon 6/6 and having a circular sectional shape, with a single fiber fineness of 2.57 dtex, the number of filaments being 136 yarns, a total fineness of 350 dtex, no twist provided, a strength of 8.5 cN/dtex, and an elongation of 23.5%, were employed as warp yarns and weft yarns.

Weaving

Employing the yarns mentioned above were used for warp yarns and weft yarns, a woven fabric was woven by a water jet loom weaving machine, with the reed threading width being 227 cm, the cover factor being 2245, the warp yarn tension during weaving being 130 cN/yarn, the weaving machine rotation speed being 800 rpm, the warp density being 59 yarns/2.54 cm, and the weft density being 59 yarns/2.54 cm.

At that time, as selvage-tightening yarns for both selvage portions, there was adopted a construction in which four yarns for each of left and right were supplied from paper tubes, and a spring washer was employed to manage the tension when the yarns were supplied. Every two of the false-twisted polyester yarns of 334 dtex and 96 filaments having a crimp rate of 2.5% were drawn from the vicinity of the warp beam in the rear of the weaving machine and doubled to form a yarn having a total fineness of 668 dtex. Every two of the false-twisted polyester yarns were threaded through healds and through a reed split, in a straight draw manner. The supply tension of the selvage-tightening yarns was adjusted to 100 cN, which was 0.15 cN/dtex per total fineness of the selvage-tightening yarns.

As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were also used. Six of such additional yarns were drawn along each of both warp end portions and passed through the healds at the warp end portion and through the reed.

A bar temple was used between the reed beating portion and the friction roller. The timing of contact of the reed and the weaving shed was as shown in Table 1. The recession of the weaving shed in the selvage portions was able to be restrained to a small extent. Therefore, we found that a high-density airbag base cloth, with the reed threading width being 200 cm or greater and the cover factor being 2000 or greater, which has been unable to be woven, can be woven at 800 rpm and while restraining the recession of the weaving shed at the selvage end portions, and with a reduced amount of selvage waving, and furthermore, the state of selvage tightening is uniform and good.

Heat Setting

Next, using a pin tenter dryer, this woven fabric was subsequently subjected to heat setting processing at 180° C. for 1 minute under a dimension restriction of a width input rate of 0% and an overfeed rate of 0%. As for the obtained woven fabric for airbags, the amount of bow of the base cloth was 10 mm, the tensile strength (warp/weft) in the base cloth physical property was 710/721 N, the elongation at break (warp/weft) was 36.4/27.8%, the tear strength (warp/weft) was 228/231 N, the amount of air permeation of the base cloth was 96.9 L/m$^2$, the edgecomb resistance value (warp/weft) was 287/272 N. Thus, the woven fabric had good physical properties.

Comparative Example 1

Warp Yarns, Weft Yarns

Yarns similar to those used in Example 1 were used as warp yarns and weft yarns.

Weaving

The yarns mentioned above were used for warp yarns and weft yarns. The weaving machine conditions were similar to those in Example 1. As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were also used. Six of such additional yarns were drawn along each of both warp end portions and passed through the healds at the warp end portion and through the reed.

A selvage-tightening yarn was not used. During weaving, selvage portion warps are loosened, fluff occurred, and weaving was not possible.

Comparative Example 2

Warp Yarns, Weft Yarns

Yarns similar to those used in Example 1 were used as warp yarns and weft yarns.

Weaving

Weaving was performed, with the weaving density of the warp yarns being 54 yarns/2.54 cm, the weaving density of the weft yarns being 54 yarns/2.54 cm, a water jet loom being used as a weaving machine, the reed threading width being 227 cm, the cover factor being 2213, the warp yarn tension during weaving being 180 cN/yarn, and the weaving machine rotation speed being 800 rpm.

At that time, as selvage-tightening yarns for both selvage portions, there was adopted a construction in which four yarns for each of left and right were supplied from paper tubes, and a spring washer was employed to manage the tension when the yarns were supplied. Every two of the false-twisted polyester yarns of 167 dtex and 48 filaments having a crimp rate of 2.5% were drawn from the vicinity of the warp beam in the rear of the weaving machine and doubled to form a yarn having a total fineness of 334 dtex. Every two of the yarns were threaded through healds and through a reed split, in a straight draw manner. The supply tension of the selvage-tightening yarns was adjusted to 100 cN, which was 0.3 cN/dtex per total fineness of the selvage-tightening yarns.

As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were also used. Six of such additional yarns were drawn along each of both warp end portions and passed through the healds at the warp end portion and through the reed.

A bar temple was used between the reed beating portion and the friction roller. Warp looseness of the selvage portions was observed, and therefore fluff occurred during weaving. Therefore, a high-density airbag base cloth with the reed threading width being 200 cm or greater and the cover factor being 2000 or greater could not be woven at 800 rpm.

Heat Setting

Next, this woven fabric was subjected to heat setting processing similar to that in Example 1.

As for the obtained woven fabric for airbags, the amount of bow of the base cloth was 12 mm and the difference in the amount of air permeation between the selvage portions and the central portion was large so that the amount of air permeation of the woven fabric did not reach a target value. Furthermore, the recession of the weaving shed at the cloth fell was large and therefore the selvage waving of the base cloth was great so that the base cloth was one that could not be used as an airbag base cloth.

Comparative Example 3

Warp Yarns, Weft Yarns

Yarns similar to those used in Example 1 were used as warp yarns and weft yarns.

Weaving

Using the warp yarns and the weft yarns mentioned above, weaving was performed with the weaving density of the warp yarns being 54 yarns/2.54 cm, the weaving density of the weft yarns being 54 yarns/2.54 cm, the reed threading width being 140 cm, the weaving machine rotation speed being 800 rpm, and the warp yarn tension being 180 cN/yarn. As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were also used. Six of such additional yarns were drawn along each of both warp end portions and passed through the healds at the warp end portion and through the reed.

A construction in which selvage-tightening yarns for the selvage portions were not used was adopted. The timing of contact of the reed and the weaving shed were as shown in Table 1. Since the reed threading width was as narrow as 140 cm, weaving was able to be performed without using selvage-tightening yarns for the selvage portions. However, the recession of the selvage portions and the selvage waving were great.

Heat Setting

Next, this woven fabric was subjected to heat setting processing similar to that in Example 1.

As for the obtained woven fabric for airbags, the reed threading width was narrow and the running tension of the weft yarns was low so that the angle of contact between the reed at the side of a nozzle for jetting the weft yarn and the weaving sheds of the selvage portions reached a target of 325 degrees. Therefore, the amount of bow of the base cloth was 13 mm. As for the base cloth physical properties, the tensile strength (warp/weft) was 801/827 N, the elongation at break (warp/weft) was 35.3/26.2%, the tear strength (warp/weft) was 281/277 N, the amount of air permeation of the base cloth was 86.4 L/m², and the edgecomb resistance value (warp/weft) was 363/343 N. Thus, all the target values were satisfied. However, since the reeding width was as narrow as 140 cm, the amount of production of the base cloth was inferior.

Comparative Example 4

Warp Yarns, Weft Yarns

Yarns similar to those used in Example 1 were used as warp yarns and weft yarns.
Weaving
Using the warp yarns and the weft yarns mentioned above, weaving was performed with the weaving density of the warp yarns being 54 yarns/2.54 cm, the weaving density of the weft yarns being 54 yarns/2.54 cm, the reed threading width being 227 cm, the weaving machine rotation speed being 600 rpm, and the warp yarn tension being 180 cN/yarn. As binding yarns, Nylon monofilaments of 22 dtex were used. Two of such binding yarns were drawn along each of both warp end portions from a planetary device and passed through the healds at the warp end portion and through the reed. As for additional yarns, Nylon monofilaments of 22 dtex were also used. Six of such additional yarns were drawn along each of both warp end portions and passed through the healds at the warp end portion and through the reed.

A construction in which selvage-tightening yarns from the vicinity of the warp beam to the selvage portions were not used was adopted. The timing of contact of the reed and the weaving shed were as shown in Table 1. Since the weaving machine rotation speed was as slow as 600 rpm, weaving was able to be performed without using selvage-tightening yarns for the selvage portions. However, the recession of the selvage portions and the selvage waving were great.
Heat Setting
Next, this woven fabric was subjected to heat setting processing similar to that in Example 1.

As for the obtained woven fabric for airbags, since the weaving machine rotation speed was slow, the running tension of the weft yarns was low so that the angle of contact between the reed at the side of a nozzle for jetting the weft yarn and the weaving sheds of the selvage portions reached a target of 328 degrees. Therefore, the amount of bow of the base cloth was 14 mm. As for the base cloth physical properties, the tensile strength (warp/weft) was 724/756 N, the elongation at break (warp/weft) was 32.1/24.4%, the tear strength (warp/weft) was 274/261 N, the amount of air permeation of the base cloth was 99.7 L/m², and the edgecomb resistance value (warp/weft) was 334/296 N. Thus, all the target values were satisfied. However, as the weaving machine rotation speed was slow, the amount of production of the base cloth was inferior.

Various results of Examples and Comparative examples mentioned above are collectively shown in Tables 1 and 2.

TABLE 1

|  |  | Example 1 | Example 2 | Example 3 | Example 4 |
|---|---|---|---|---|---|
| Weaving machine rotation speed | rpm | 800 | 800 | 800 | 800 |
| Reed threading width | cm | 227 | 227 | 227 | 227 |
| Number of selvage-tightening yarns inserted |  | 4 yarns for each of left and right | 4 yarns for each of left and right | 4 yarns for each of left and right | 4 yarns for each of left and right |
| Total fineness of selvage-tightening yarns | dtex/yarn | 334 | 334 | 334 | 334 |
| Cover factor | — | 2213 | 2213 | 2213 | 2245 |
| Total fineness of ground yarns | dtex | 470 | 470 | 470 | 350 |
| Ratio of total fineness of selvage-tightening yarns to total fineness of ground yarns | % | 142 | 142 | 142 | 191 |
| Single fiber fineness | dtex | 6.52 | 6.52 | 3.45 | 2.57 |
| Timing of contact of reed and weaving shed (nozzle side/center/opposite to nozzle side) | degree | 328/333/330 | 327/333/329 | 329/333/331 | 329/335/333 |
| Amount of bow | mm | 8 | 8 | 8 | 10 |
| Thickness of woven fabric | mm | 0.32 | 0.32 | 0.33 | 0.25 |
| Weaving density (warp/weft) | yarns/2.54 cm | 54/54 | 54/54 | 54/54 | 59/59 |
| weight | (g/m²) | 215.2 | 215.4 | 213.8 | 212.1 |
| Tensile strength (warp/weft) | N | 766/784 | 753/771 | 744/773 | 710/721 |
| Elongation at break (warp/weft) | % | 35.5/25.6 | 34.4/24.1 | 34.8/24.7 | 36.4/27.8 |
| Tear strength (warp/weft) | N | 271/268 | 260/255 | 266/257 | 228/231 |
| Amount of air permeation through woven fabric | L/m² | 95.6 | 88.3 | 89.7 | 96.9 |
| edgecomb resistance (warp/weft) | N | 329/319 | 338/331 | 342/327 | 287/272 |
| Selvage waving of base cloth | — | ◉ | ◉ | ◉ | ○ |

TABLE 2

|  |  | Comparative example 1 | Comparative example 2 | Comparative example 3 | Comparative example 4 |
|---|---|---|---|---|---|
| Weaving machine rotation speed | rpm | 800 | 800 | 800 | 600 |
| Reed threading width | cm | 227 | 227 | 140 | 227 |
| Number of selvage-tightening yarns inserted |  | None | 4 yarns for each of left and right | None | None |
| Total fineness of selvage-tightening yarns | dtex/yarn | — | 334 | — | — |
| Cover factor | — | 2213 | 2213 | 2213 | 2213 |
| Total fineness of ground yarns | dtex | 470 | 470 | 470 | 470 |
| Ratio of total fineness of selvage-tightening yarns to total fineness of ground yarns | % | — | 71 | — | — |
| Single fiber fineness | dtex | 6.52 | 6.52 | 6.52 | 6.52 |
| Timing of contact of reed and weaving shed | degree | Not weavable due to | 324/332/330 | 326/334/332 | 328/333/330 |

TABLE 2-continued

|  |  | Comparative example 1 | Comparative example 2 | Comparative example 3 | Comparative example 4 |
|---|---|---|---|---|---|
| (nozzle side/center/opposite to nozzle side) |  | looseness of warps in selvage portions |  |  |  |
| Amount of bow | mm | — | 12 | 13 | 14 |
| Thickness of woven fabric | mm | — | 0.32 | 0.32 | 0.32 |
| Weaving density (warp/weft) | yarns/2.54 cm | — | 54/54 | 54/54 | 54/54 |
| weight | (g/m$^2$) | — | 211.8 | 132 | 212 |
| Tensile strength (warp/weft) | N | — | 716/803 | 801/827 | 724/756 |
| Elongation at break (warp/weft) | % | — | 33.2/24.3 | 35.3/26.2 | 32.1/24.4 |
| Tear strength (warp/weft) | N | — | 265/256 | 281/277 | 274/261 |
| Amount of air permeation through woven fabric | L/m$^2$ | — | 104.7 | 86.4 | 99.7 |
| edgecomb resistance (warp/weft) | N | — | 418/335 | 363/343 | 334/296 |
| Selvage waving of base cloth | — | — | X | X | X |

INDUSTRIAL APPLICABILITY

The woven fabric is capable of restraining the recession of the weaving sheds of the selvage end portions, which becomes a problem at the time of high-density woven fabric weaving where an increased width and an increased speed are required, and is also capable of lessening the selvage waving depending on conditions. The woven fabric is suitable particularly for a base cloth for airbags. Airbags obtained by using this base cloth can be used for a driver's seat and for a passenger's seat, and as side airbags for side collision and the like.

The invention claimed is:

1. A woven fabric comprising:
   a synthetic fiber multifilament yarn as a ground yarn, and in a selvage weave portion present in an end portion of the woven fabric;
   a binding yarn constructed of a filament having a fineness of 33 dtex or less;
   an additional yarn constructed of a filament having a fineness of 33 dtex or less; and
   a selvage-tightening yarn constructed of a multifilament having a total fineness that is 80% or greater of the total fineness of the ground yarn.

2. The woven fabric according to claim 1, wherein the filaments of 33 dtex or less that constitute the binding yarn and the additional yarn are each a monofilament.

3. The woven fabric according to claim 1, which is a woven fabric for an airbag base cloth.

4. The woven fabric according to claim 1, wherein a width of the woven fabric is 160 cm or greater.

5. The woven fabric according to claim 1, wherein a cover factor of the woven fabric is 1800 to 2500.

6. The woven fabric according to claim 1, wherein the multifilament that constitutes the selvage-tightening yarn is a multifilament yarn that has a crimp.

7. A process of producing a woven fabric according to claim 1, wherein the woven fabric comprises a synthetic fiber multifilament yarn as a ground yarn, comprising, to form a selvage weave portion present in an end portion of the woven fabric: using a filament having a fineness of 33 dtex or less in a binding yarn and an additional yarn; and performing weaving while inserting a multifilament having a total fineness that is 80% or greater of the total fineness of the ground yarn into the selvage weave portion as a selvage-tightening yarn.

8. The process according to claim 7, wherein the filaments of 33 dtex or less that constitute the binding yarn and the additional yarn are each a monofilament.

9. The process according to claim 7, wherein the selvage-tightening yarn is a multifilament having a tensile strength of 1.0 to 7.0 cN/dtex, and is inserted into both selvage weave portions at a supply tension of 0.1 to 0.7 cN/dtex per total fineness.

10. The process according to claim 7, wherein the woven fabric is woven by using a water jet loom weaving machine as a weaving machine.

11. The process according to claim 7, wherein the woven fabric is woven with a rotation speed of the weaving machine at 700 rotations/minute or greater.

12. The woven fabric according to claim 2, which is a woven fabric for an airbag base cloth.

13. The woven fabric according to claim 2, wherein a width of the woven fabric is 160 cm or greater.

14. The woven fabric according to claim 3, wherein a width of the woven fabric is 160 cm or greater.

15. The woven fabric according to claim 2, wherein a cover factor of the woven fabric is 1800 to 2500.

16. The woven fabric according to claim 3, wherein a cover factor of the woven fabric is 1800 to 2500.

17. The woven fabric according to claim 4, wherein a cover factor of the woven fabric is 1800 to 2500.

18. The process according to claim 8, wherein the selvage-tightening yarn is a multifilament having a tensile strength of 1.0 to 7.0 cN/dtex, and is inserted into both selvage weave portions at a supply tension of 0.1 to 0.7 cN/dtex per total fineness.

19. The process according to claim 8, wherein the woven fabric is woven by using a water jet loom weaving machine as a weaving machine.

20. The process according to claim 9, wherein the woven fabric is woven by using a water jet loom weaving machine as a weaving machine.

* * * * *